United States Patent
Osawa (10) Patent No.: US 10,108,468 B2
(45) Date of Patent: Oct. 23, 2018

(54) INFORMATION PROCESSING APPARATUS, NON-TRANSITORY STORAGE MEDIUM, AND INFORMATION PROCESSING METHOD

(71) Applicant: CANON KABUSHIKI KAISHA, Tokyo (JP)

(72) Inventor: Takaharu Osawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 57 days.

(21) Appl. No.: 15/230,929

(22) Filed: Aug. 8, 2016

(65) Prior Publication Data
US 2017/0052833 A1    Feb. 23, 2017

(30) Foreign Application Priority Data
Aug. 20, 2015    (JP) .................. 2015-162918

(51) Int. Cl.
| | | |
|---|---|---|
| G06F 3/00 | (2006.01) | |
| G06F 9/44 | (2018.01) | |
| G06F 9/46 | (2006.01) | |
| G06F 13/00 | (2006.01) | |
| G06F 9/54 | (2006.01) | |
| G06F 17/22 | (2006.01) | |

(52) U.S. Cl.
CPC .......... *G06F 9/543* (2013.01); *G06F 17/2211* (2013.01)

(58) Field of Classification Search
None
See application file for complete search history.

(56) References Cited

U.S. PATENT DOCUMENTS

| | | | |
|---|---|---|---|
| 2003/0204810 A1* | 10/2003 | Dam .................. | G06F 17/3089 715/255 |
| 2004/0133566 A1 | 7/2004 | Ishiguro | |
| 2012/0096067 A1* | 4/2012 | Murai .................... | H04L 63/08 709/203 |

\* cited by examiner

*Primary Examiner* — Craig C Dorais
(74) *Attorney, Agent, or Firm* — Canon U.S.A., Inc. IP Division (57) ABSTRACT

An information processing apparatus acquires edited contents of a document currently being edited, transmits the acquired edited contents to an external apparatus, acquires information about related files related to the document currently being edited from the external apparatus, and displays a list of the acquired information about related files.

6 Claims, 11 Drawing Sheets

INFORMATION PROCESSING APPARATUS, NON-TRANSITORY STORAGE MEDIUM, AND INFORMATION PROCESSING METHOD

BACKGROUND

Field

Aspects of the present invention generally relate to an information processing apparatus configured to display information about related files.

Description of the Related Art

U.S. Patent Application Publication No. 2004/0133566 discusses a technique where, when a user selects a desired file from a list of files, a search key is extracted from the selected file, related files are searched using the extracted search key, and results of the search are presented to the user.

There is a demand for referring to documents related to a document currently being generated by a user. The contents of the document currently being generated are constantly changing as the user edits the document, for example, entering text.

The technique discussed in U.S. Patent Application Publication No. 2004/0133566 searches for document files related to a document file selected from a list of documents by a user, and does not consider presentation of documents related to a document currently being edited. In other words, when searching for documents related to a document currently being edited using the technique discussed in U.S. Patent Application Publication No. 2004/0133566, the user needs to stop editing the document, store it, and select the stored document. Then, documents related to the selected document are searched and results presented. The user needing to stop document editing and provide an instruction to search for documents increases the burden on the user and reduces the efficiency of document editing.

SUMMARY

According to an aspect of the present invention, an information processing apparatus includes a processor, and a storage device storing computer executable instructions. The processor executes the computer executable instructions to function as a first acquisition unit configured to acquire edited contents of a document currently being edited, a second acquisition unit configured to transmit the acquired edited contents to an external apparatus and acquire information about related files related to the document currently being edited from the external apparatus, and a display unit configured to display a list of the information.

Further features of aspects of the present invention will become apparent from the following description of exemplary embodiments with reference to the attached drawings.

DESCRIPTION OF THE EMBODIMENTS

Exemplary embodiments for embodying the present invention will be described below with reference to the accompanying drawings.

Figure 1:
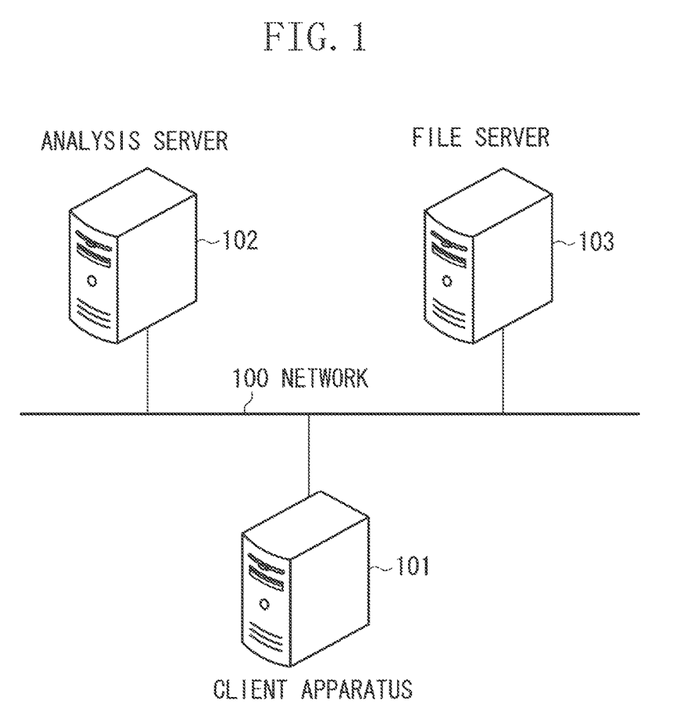
FIG. 1 illustrates an example of a system configuration according to an exemplary embodiment of the present invention.

A first exemplary embodiment will be described below. FIG. 1 illustrates an example of a system configuration according to the present exemplary embodiment. This system includes a client apparatus (information processing apparatus) 101, an analysis server 102, and a file server 103 that are connected with each other via a network 100. The network 100 is an intranet, the Internet, or other type of network. A gateway and a router (not illustrated) can exist between the network 100 and the client apparatus 101.

The analysis server 102 acquires files stored in the file server 103, extracts text information (file feature information) from each file, and, after associating the extracted text information with the storage destination of each file, stores the extracted text information in a database (DB) in the analysis server 103. When searching for related files, the analysis server 102 compares data extracted from a comparison target file with the text information stored in the DB to search for related files similar to the comparison target file, and presents the names and pieces of storage destination information of the related files. The file server 103 stores files.

Figure 2:
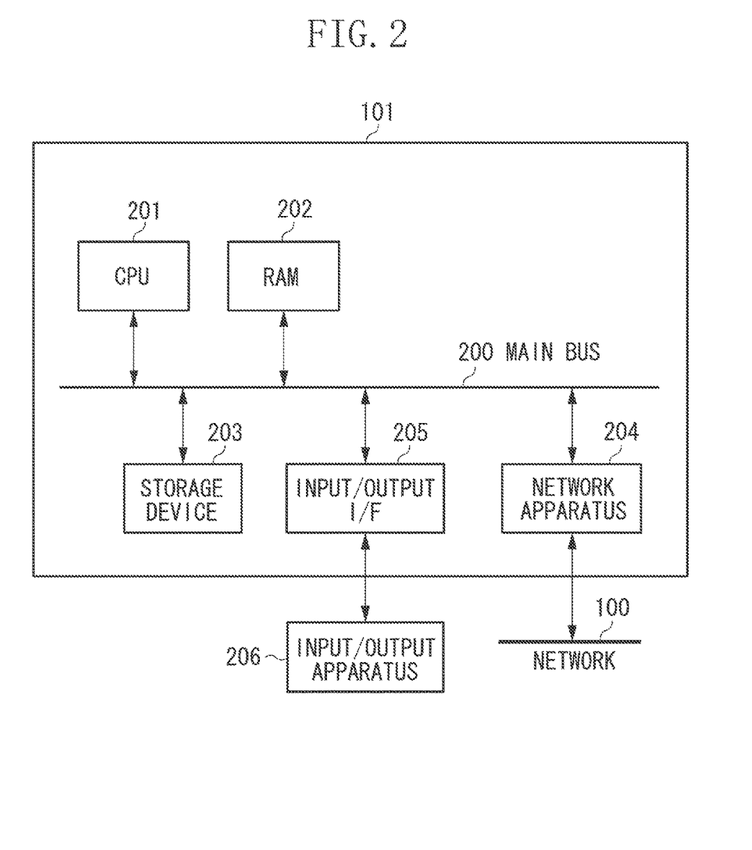
FIG. 2 illustrates an example of a hardware configuration of a client apparatus.

FIG. 2 illustrates an example of a hardware configuration of the client apparatus (information processing apparatus) 101. A central processing unit (CPU) (processor or computer) 201 reads a computer program (application program) stored in a storage device (computer-readable storage medium) 203 and executes the computer program to function as each processing unit of the client apparatus 101 which constitutes aspects of the present invention. The CPU 201 uses a random access memory (RAM) 202 as a work area to execute a program. The client apparatus 101 further includes a network apparatus 204 for communicating with other apparatuses via the network 100, an input/output interface (I/F) 205 for displaying information and receiving instructions from a user via an input/output apparatus 206, and a main bus 200 for performing communication between components of the client apparatus 101. The input/output I/F 205 is provided with, for example, a Personal System/2 (PS/2), a Universal Serial Bus (USB) I/F, or an analog/digital display I/F. The input/output apparatus 206 includes a keyboard and a mouse for receiving an instruction from a user, and a cathode ray tube (CRT) or a liquid crystal display (LCD) for displaying information.

Figure 3:
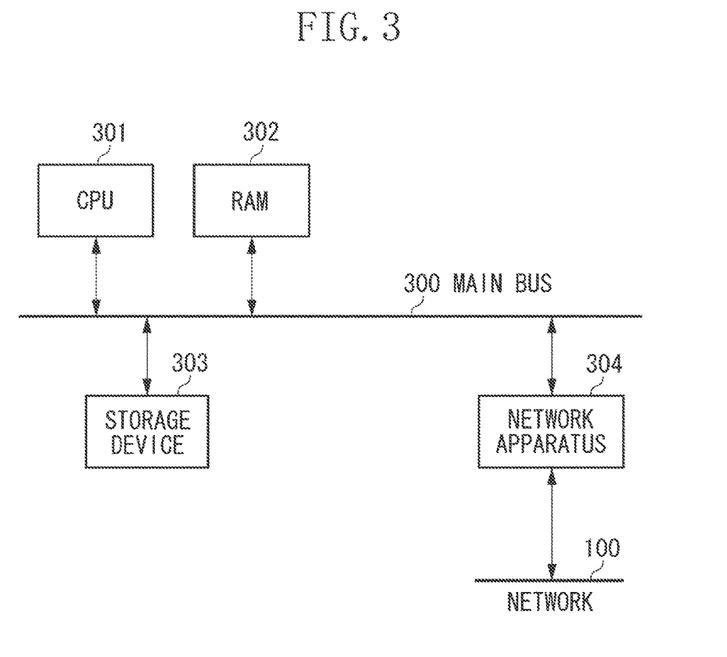
FIG. 3 illustrates an example of a hardware configuration of an analysis server and a file server.

The hardware configurations of the analysis server 102 and file server 103 are similar, so FIG. 3 illustrates an example of the hardware configuration of both the analysis server 102 and the file server 103. A CPU 301 reads a computer program for the analysis server 102 or the file server 103 stored in a storage device 303 and executes the computer program to function as each processing unit of the analysis server 102 or file server 103 respectively, which constitutes aspects of the present invention. The CPU 301 uses a RAM 302 as a work area to execute a program. Both the analysis server 102 and the file server 103 include a network apparatus 304 for communicating with other apparatuses via the network 100, and a main bus 300 for performing communication between components of each respective server apparatus.

Figure 4:
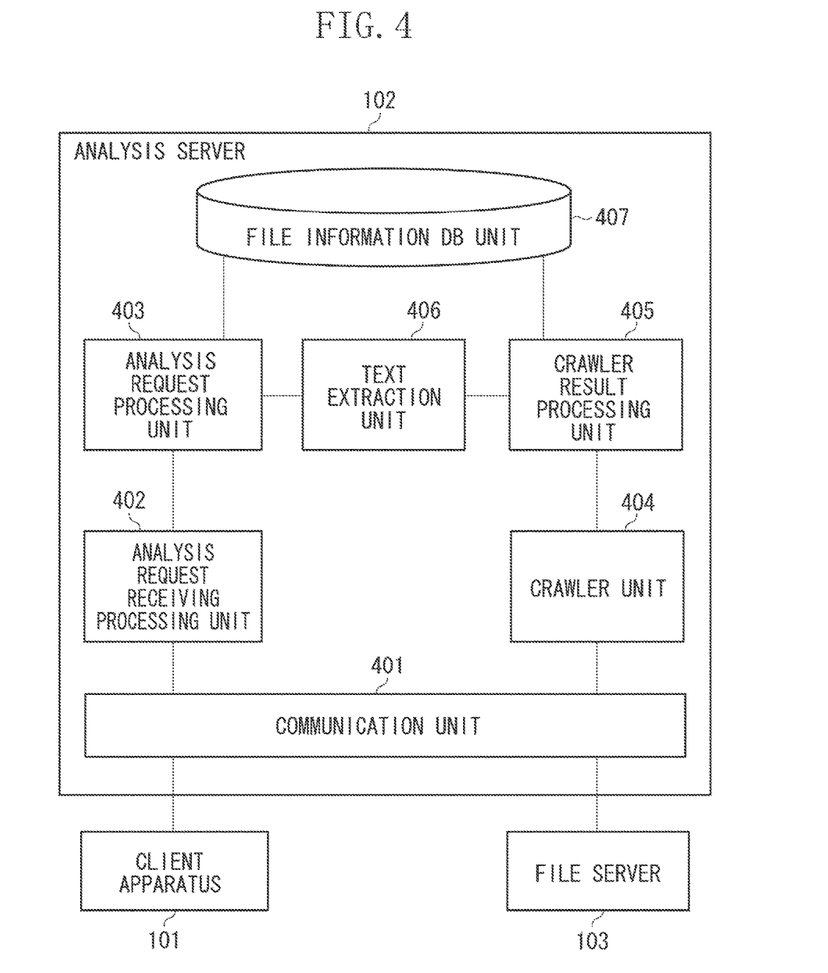
FIG. 4 illustrates an example of a software configuration of the analysis server.

In the analysis server 102, the CPU 301 executes a program to collaborate with the hardware components 302 to 304 to function as a communication unit 401, an analysis request receiving processing unit 402, an analysis request processing unit 403, a crawler unit 404, a crawler result processing unit 405, a text extraction unit 406, and a file information DB unit 407 illustrated in FIG. 4.

The crawler unit 404 communicates with the file server 103 via the communication unit 401 to collect files (electronic data) stored in the file server 103 and pieces of storage destination information (file paths) of these files. The crawler unit 404 periodically accesses the file server 103 to collect information. The crawler unit 404 collects files that have been registered or updated after the last information collection processing and does not collect files where information collection processing has completed, thus improving the efficiency of information collection processing. The crawler unit 404 transfers collected files and pieces of storage destination information thereof to the crawler result processing unit 405.

The crawler result processing unit 405 transfers a file received from the crawler unit 404 to the text extraction unit 406, and receives, as a response from the text extraction unit 406, text information (file feature information) extracted from the file. Then, the crawler result processing unit 405 stores, in the file information DB unit 407, the text information received from the text extraction unit 406 and storage destination information of the file.

The analysis request receiving processing unit 402 receives a file analysis request (information acquisition request for files related to an analysis target file) from the client apparatus 101 via the communication unit 401. The analysis request receiving processing unit 402 receives the analysis target file together with the file analysis request from the client apparatus 101. The analysis request receiving processing unit 402 also performs processing for transmitting, as a response, the result of analysis obtained by the analysis request processing unit 403 (described below) to the client apparatus 101.

The analysis request processing unit 403 transfers the analysis target file received by the analysis request receiving processing unit 402 to the text extraction unit 406, and receives, as a response from the text extraction unit 406, text information (feature information of the analysis target file) extracted from the analysis target file. The analysis request processing unit 403 further acquires stored file feature information from the file information DB unit 407 and performs comparison processing (search processing) for comparing the file feature information with the text information of the analysis target file (feature information of the analysis target file) received from the text extraction unit 406. After the comparison, the analysis request processing unit 403 transfers file information determined to be related to the analysis target file (for example, information of files having similar comparison results) to the analysis request receiving processing unit 402 as a result of analyzing the analysis target file.

The text extraction unit 406 performs processing for extracting text information from a file. The text extraction unit 406 can be configured to perform processing for dividing the extracted text information into suitable segments, summing up the number of appearances of a keyword, analyzing the layout of text and drawings, and outputting the result of the processing as file feature information. In other words, the text extraction unit 406 can be configured to transfer text extracted from files, as it is, as file feature information to the crawler result processing unit 405 and the analysis request processing unit 403. The text extraction unit 406 can also be configured to transfer the result of analyzing text and layouts in files as file feature information to the crawler result processing unit 405 and the analysis request processing unit 403.

Figure 5:
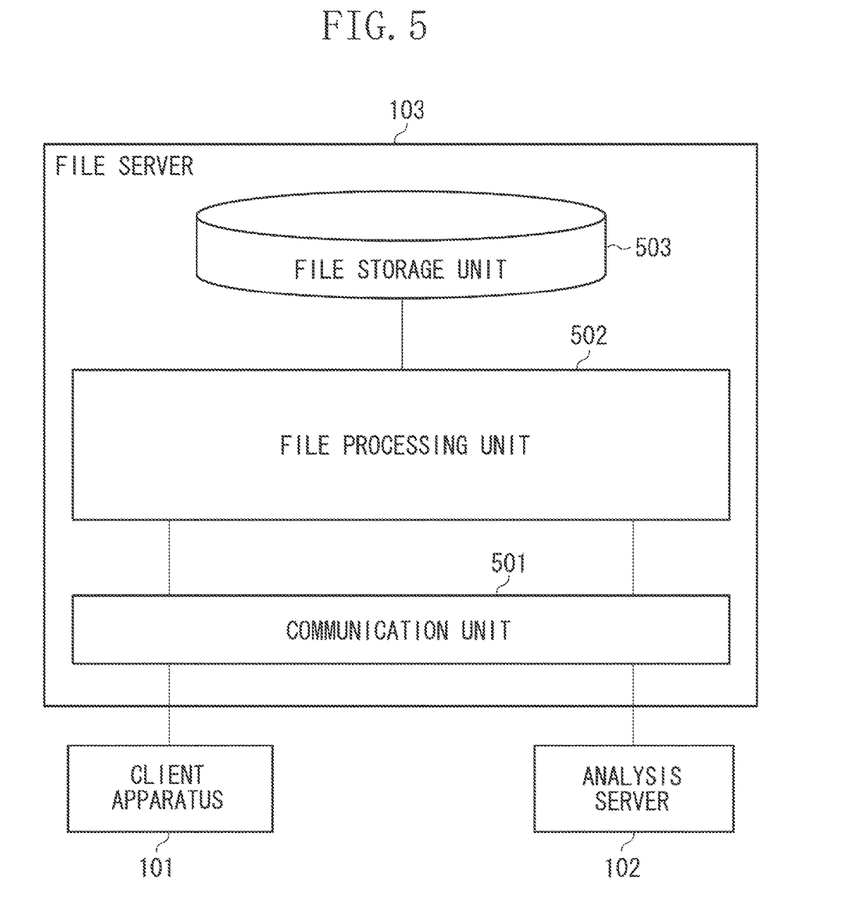
FIG. 5 illustrates an example of a software configuration of the file server.

In the file server 103, the CPU 301 executes a program to collaborate with the hardware components 302 to 304 to function as a communication unit 501, a file processing unit 502, and a file storage unit 503 illustrated in FIG. 5.

The file processing unit 502 receives requests from the client apparatus 101 and the analysis server 102 via the communication unit 501. Types of requests received by the file processing unit 502 include a request for storing a file in the file storage unit 503 and a request for acquiring a file stored in the file storage unit 503. In response to the respective received request, the file processing unit 502 stores a file in the file storage unit 503 or acquires a file from the file storage unit 503. The file storage unit 503 holds file entities according to an instruction of the file processing unit 502.

Figure 6:
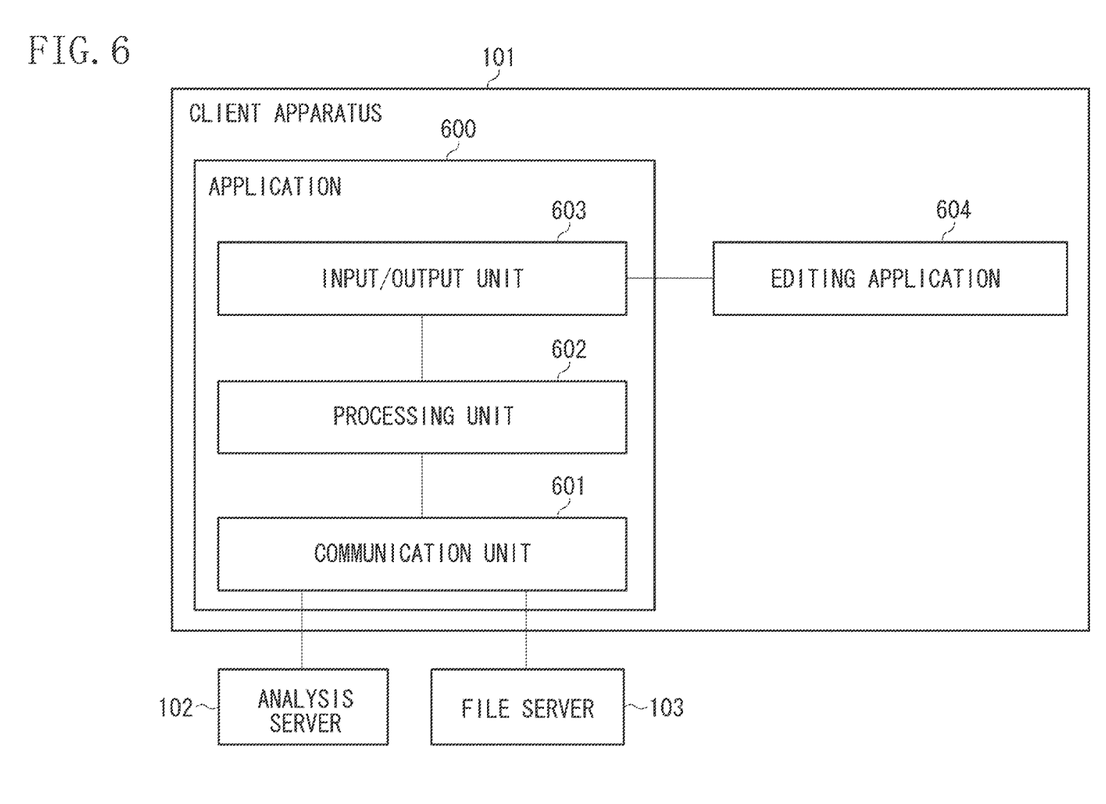
FIG. 6 illustrates an example of a software configuration of the client apparatus.

FIG. 6 is a diagram illustrating a software configuration of an application 600 for presenting related files and an editing application 604 for editing a document file, which are executed by the client apparatus 101. The application 600 and the editing application 604 are stored in the storage device 203 and are executed by the CPU 201 included in the client apparatus 101.

When the CPU 201 of the client apparatus 101 executes the application 600, the CPU 201 functions as the communication unit 601, the processing unit 602, and the input/output unit 603.

The processing unit 602 communicates with the analysis server 102 and the file server 103 via the communication unit 601. A series of processing sequences mainly performed by the processing unit 602 will be described below with reference to FIG. 8. As main processing, the application 600 transmits to the analysis server 102 the contents of a document acquired from the editing application 604 and receives an analysis result as a response from the analysis server 102. Then, in the application 600, the processing unit 602 processes the received analysis result (information about related documents), and the input/output unit 603 performs processing for displaying the analysis result (information about related documents) via the input/output apparatus 206.

The editing application 604 can be any application used to edit a document, such as Microsoft® Word.

Figure 7:
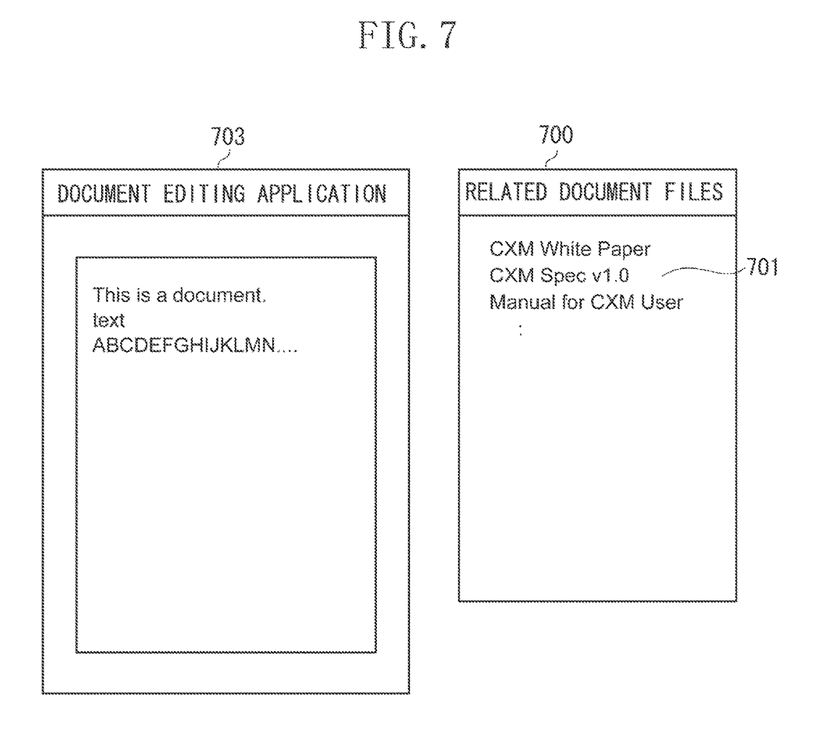
FIG. 7 illustrates examples of windows displayed by an application and an editing application of the client apparatus.

FIG. 7 illustrates examples of screens displayed on the input/output apparatus 206 by the client apparatus 101 according to the present exemplary embodiment. When the CPU 201 of the client apparatus 101 executes the application 600, a window 700 for displaying related document files is displayed. When the CPU 201 executes the editing application 604 for document editing, a window 703 for document editing is displayed.

When the user edits a document through the user's editing operations on the window 703 displayed by the editing application 604, the application 600 acquires the contents of the document currently being edited from the editing application 604 and transmits the contents to the analysis server 102. The application 600 is able to acquire the contents of the document currently being edited from the editing application 604 via a predetermined Application Programming Interface (API). Then, the application 600 acquires pieces of information about related files as a response from the analysis server 102, and displays a list of the pieces of information about related files in a display area 701 of the window 700 for displaying related document files. A link indicating the file path to each related file is given to the file name so that, when the user clicks any one of the related files displayed in the list, the selected related file is opened. Although only the file names of related files are displayed in the list in the display area 701 illustrated in FIG. 7, the display contents are not limited thereto, and storage destination folders can be displayed together with the file names of related files.

Figure 8:
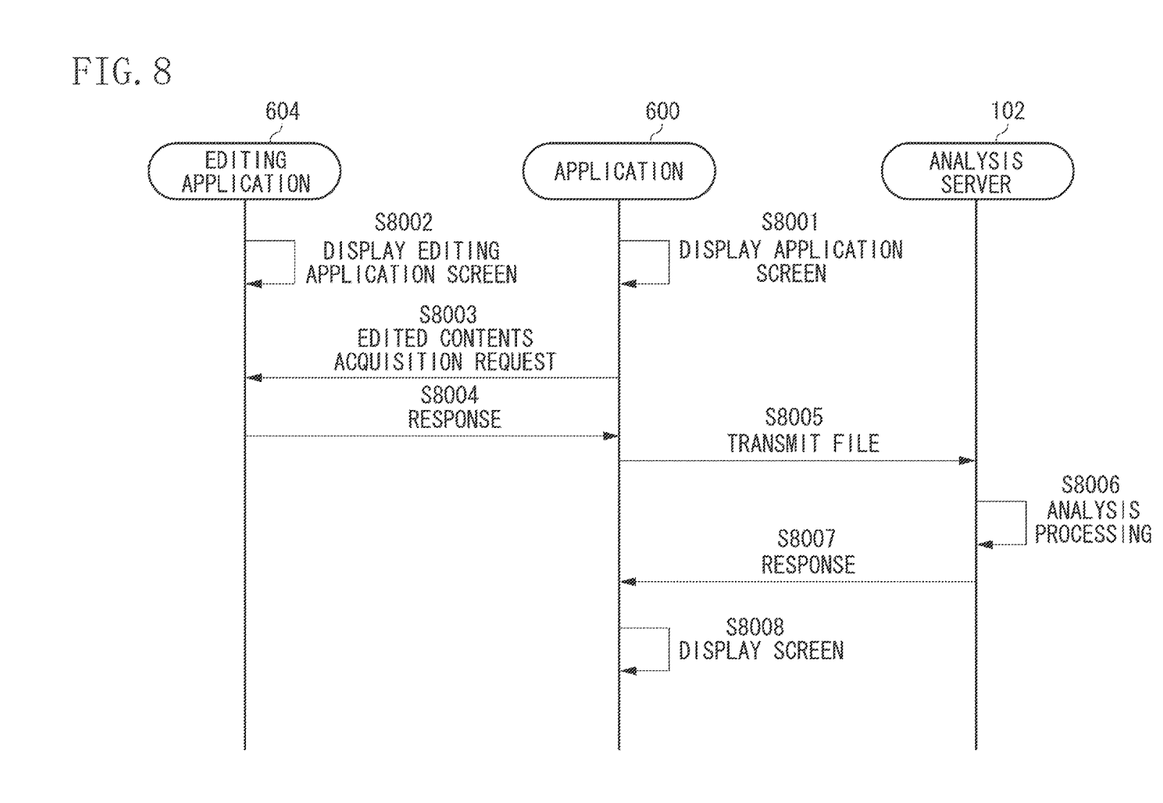
FIG. 8 is a sequence diagram illustrating processing until files related to a document currently being edited are displayed.

FIG. 8 is a sequence diagram illustrating processing performed by the application 600 to acquire the edited contents of the document currently being edited from the editing application 604, acquire pieces of information of files related to the document from the analysis server 102 based on the edited contents, and display the acquired pieces of information. The following descriptions start with processing to be performed in the client apparatus 101, in which the application 600 and the editing application 604 are activated, and the window screens 700 and 703 illustrated in FIG. 7 are displayed on the input/output apparatus 206.

Upon activation of the application 600, in step S8001, the application 600 displays the window 700 of the application 600 on the input/output apparatus 206, as illustrated in FIG. 7. Upon activation of the editing application 604, in step S8002, the editing application 604 displays the window 703 of the editing application 604 on the input/output apparatus 206, as illustrated in FIG. 7.

In step S8003, the application 600 periodically transmits an edited contents acquisition request to the editing application 604 via a predetermined API. Upon reception of the edited contents acquisition request, in step S8004, the editing application 604 returns, as a file, to the application 600 the contents of the document currently being edited, displayed on the window 703. Although, in the present exemplary embodiment, the file (edited contents file) returned by the editing application 604 in step S8004 is described to include data of the entire document currently being edited, the configuration is not limited thereto. The editing application 604 can return a part of data of the document currently being edited (for example, data of the page currently being edited, data of the page currently actually being edited along with the preceding and following pages, or only the body text data of the document).

When the application 600 determines that the document is updated based on the returned edited contents file, in step S8005, the application 600 transmits the acquired edited contents file to the analysis server 102 to request acquisition of pieces of information about related files. In step S8006, the analysis server 102 performs analysis processing on the received edited contents file to acquire pieces of information about related files. In step S8007, the analysis server 102 returns to the application 600 a response including the pieces of information about related files acquired as an analysis result. Upon reception of the response from the analysis server 102, in step S8008, the application 600 displays, the window 700, a list of the acquired pieces of information about related files.

Figure 9:
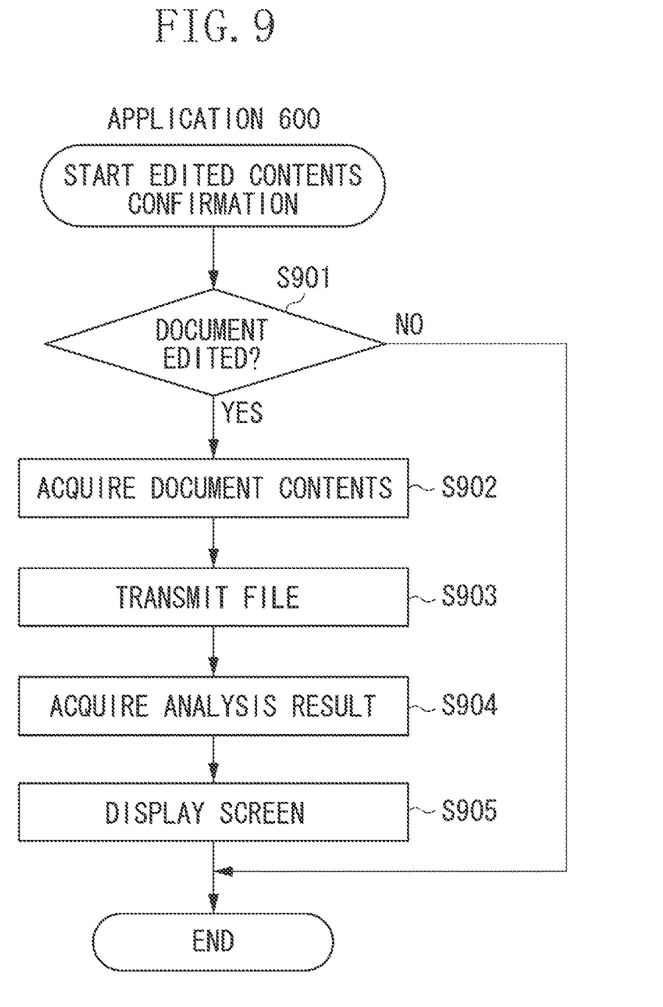
FIG. 9 is a flowchart illustrating details of processing performed by the application to acquire edited contents and display related files.

FIG. 9 is a flowchart illustrating details of processing performed by the application 600 in the processing in steps S8003 to S8008 illustrated in FIG. 8. The application 600 periodically repeats this processing (for example, at predetermined intervals) to monitor whether the document has been edited. When the application 600 determines that an editing operation has been performed, the application 600 updates display of related files.

In step S901, the application 600 determines whether the document has been edited by the editing application 604. The application 600 performs this determination based on a response received from the editing application 604 after calling a predetermined API thereto. When the application 600 determines that the document has not been edited (no difference from the last determination of editing) (NO in step S901), the processing ends. When the application 600 determines that the document has been edited (YES in step S901), then in step S902, the application 600 acquires the edited contents file of the document via the predetermined API. In step S903, the application 600 transmits the acquired edited contents file to the analysis server 102 as a request for acquiring pieces of information about related files. In step S904, the application 600 receives a response (pieces of information about related files) from the analysis server 102. In step S905, based on the acquired analysis result, the application 600 displays, in the window 700 of the application 600, a list of pieces of information about files related to the document currently being edited by the editing application 604.

As described above, according to the first exemplary embodiment, it is possible to automatically display documents related to the document currently being edited according to the document contents edited by the user.

A second exemplary embodiment will now be provided that discusses an example where the window of the application 600 displays the pieces of information about related files displayed in the first exemplary embodiment as well as other information on an automatic switching basis. In other words, while a document is being edited, the application 600 displays a list of files related to the document currently being edited and when the document editing has been completed, automatically changes window display to present a list of storage destination candidates for the edited document. Thus, during document editing, a list of referable related document files is displayed enabling the user to read the related files as required. When editing has been completed, a list of DBs (directories or folders) as registration destination candidates for the document is displayed, enabling the user to easily specify a registration destination of the document.

In addition to the function of presenting pieces of information about files related to the analysis target file (the function described in the first exemplary embodiment), the analysis server 102 includes a function of presenting pieces of information about DBs as registration destination candidates based on the pieces of storage destination information of files related to the analysis target file.

Figure 10:
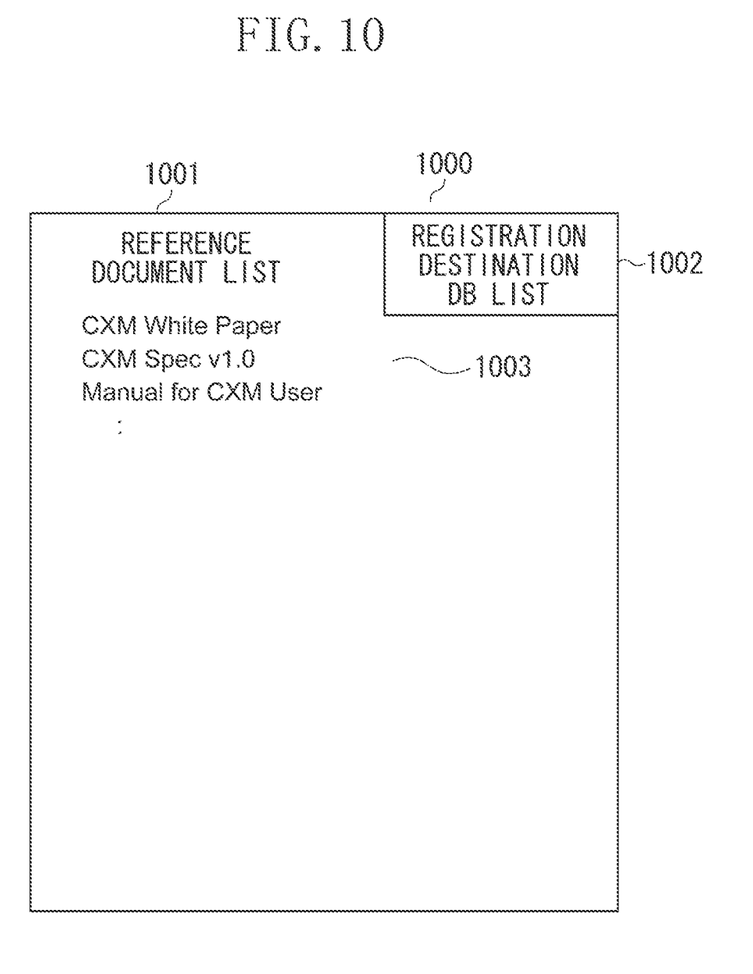
FIG. 10 illustrates an example of a window displayed by an application according to a second exemplary embodiment.

FIG. 10 illustrates an example of a window 1000 displayed by the application 600 operating on the client apparatus 101 according to the second exemplary embodiment. The window displayed by the editing application 604 is similar to window of the first exemplary embodiment, and thus, redundant descriptions thereof will be omitted.

The window 1000 includes a function of presenting to the user a list of files related to a document currently being edited as reference documents and a function of displaying a list of DBs as registration destination candidates for an edited document. Tabs 1001 and 1002 are used to manually switch between the reference document list and the registration destination DB list, respectively. A display area 1003 displays the reference document list and the registration destination DB list.

Figure 11:
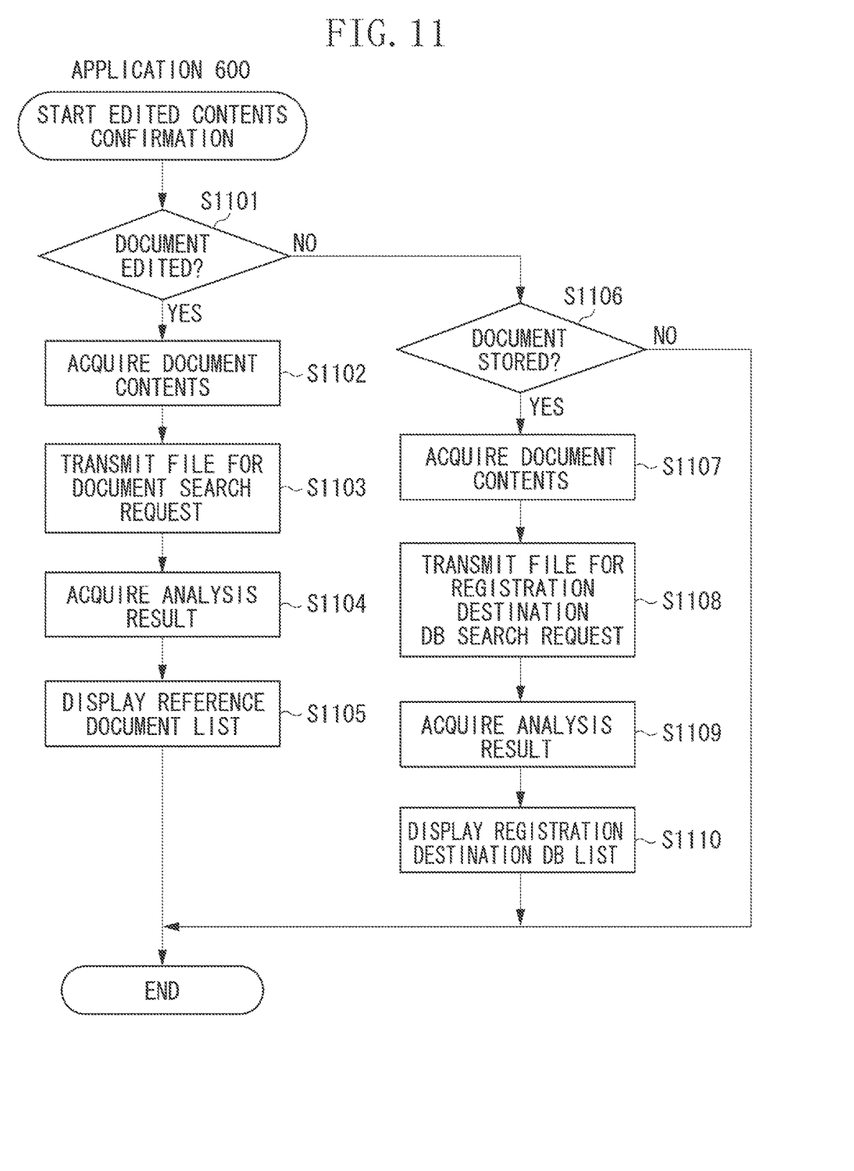
FIG. 11 is a flowchart illustrating details of processing performed by the application according to the second exemplary embodiment to acquire edited contents and display related files or registration destination candidates.

FIG. 11 is a flowchart illustrating processing performed by the application 600 to determine whether a document is currently being edited by the editing application 604 or whether the document is to be stored, and to change the display of the window 1000 depending on the result of the determination. The application 600 periodically repeats this processing to monitor whether a document has been edited or whether the document is to be stored, and updates display of the window 1000.

In step S1101, the application 600 determines whether a document has been edited by the editing application 604. When the application 600 determines that a document has not been edited (NO in step S1101), the processing proceeds to step S1106. When the application 600 determines that a document has been edited (YES in step S1101), then in step S1102, the application 600 acquires a file indicating the edited contents of the document. In step S1103, the application 600 transmits the acquired edited contents file to the analysis server 102 as a request for acquiring pieces of information about related files. In step S1104, the application 600 receives a response (pieces of information about related files) from the analysis server 102. In step S1105, based on the acquired analysis result, the application 600 brings the reference document list tab into the selected state and displays, in the window 1000 of the application 600, a list of pieces of information about files related to the document currently being edited by the editing application 604.

In step S1106, the application 600 communicates with the editing application 604 via a predetermined API to determine whether the document is to be stored. When the application 600 determines that the document is not to be stored (NO in step S1106), the processing ends. When the application 600 determines that the document is to be stored (YES in step S1106), in step S1107, the application 600 acquires a file indicating the contents of the document to be stored. In step S1108, the application 600 transmits the acquired document contents file to the analysis server 102 together with the registration destination DB search request. Upon receipt of the registration destination DB search request, the analysis server 102 searches for related files based on the information of the document contents file and acquires pieces of storage destination information of files determined to be related to the document. In response to the search request, the analysis server 102 transmits, to the application 600, the pieces of storage destination information for related files having high similarity as registration destination DB candidates. In step S1109, the application 600 receives the response from the analysis server 102. In step S1110, based on the acquired analysis result as a response, the application 600 brings the registration destination DB list tab into the selected state and displays the registration destination DB list in the window 1000.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-162918, filed Aug. 20, 2015, which is hereby incorporated by reference herein in its entirety.

What is claimed is:

1. An information processing apparatus comprising:
   a processor; and
   a storage device storing computer executable instructions, wherein the processor executes the computer executable instructions to function as:
   a determination unit configured to determine whether a document is being edited on a window of an editing application or is to be stored;
   a first acquisition unit configured to periodically acquire edited contents of the document currently being edited on the window of the editing application;
   a second acquisition unit configured to transmit the acquired edited contents to an external apparatus and acquire from the external apparatus information about related files related to the document currently being edited in a case where the determination unit determines that the document is being edited;
   a third acquisition unit configured to transmit the acquired edited contents to the external apparatus and acquire information about registration destination candidates for the document based on storage destinations of related files related to the document in a case where the determination unit determines that the document is to be stored; and
   a display unit configured to display a list of the information about the related files acquired by the second acquisition unit in a case where the determination unit determines that the document is being edited, wherein the display unit displays a list of the information about registration destination candidates for the document acquired by the third acquisition unit in a case where the determination unit determines that the document is to be stored.

2. The information processing apparatus according to claim 1, wherein the first acquisition unit periodically acquires the edited contents of the document currently being edited on the window of the editing application via a predetermined API of the editing application.

3. A non-transitory computer-readable storage medium storing computer executable instructions that cause a computer to execute a method, the method comprising:
   determining whether a document is being edited on a window of an editing application or is to be stored;
   periodically acquiring edited contents of the document currently being edited on the window of the editing application;
   transmitting the acquired edited contents to an external apparatus;
   acquiring information about related files related to the document currently being edited in a case where it is determined that the document is being edited;
   acquiring information about registration destination candidates for the document based on storage destinations of related files related to the document in a case where it is determined that the document is to be stored;
   displaying a list of the acquired information about the related files in a case where it is determined that the document is being edited; and
   displaying a list of the acquired information about the registration destination candidates for the document in a case where it is determined that the document is to be stored.

4. The non-transitory computer-readable storage medium according to claim 3, wherein the edited contents of the document currently being edited on the window of the editing application are periodically acquired via a predetermined API of the editing application.

5. An information processing method performed by an information processing apparatus, the method comprising:
   determining whether a document is being edited on a window of an editing application or is to be stored;
   periodically acquiring edited contents of the document currently being edited on the window of the editing application;
   transmitting the acquired edited contents to an external apparatus;
   acquiring information about related files related to the document currently being edited in a case where it is determined that the document is being edited;
   acquiring information about registration destination candidates for the document based on storage destinations of related files related to the document in a case where it is determined that the document is to be stored; and
   displaying a list of the acquired information about the related files in a case where it is determined that the document is being edited; and
   displaying a list of the acquired information about the registration destination candidates for the document in a case where it is determined that the document is to be stored.

6. The information processing method according to claim 5, wherein the edited contents of the document currently being edited on the window of the editing application are periodically acquired via a predetermined API of the editing application.

* * * * *